United States Patent [19]

Olafson et al.

[11] Patent Number: 4,957,714

[45] Date of Patent: Sep. 18, 1990

[54] SOLVENT EXTRACTION PROCESS

[75] Inventors: Stephen M. Olafson; Roy G. Lewis; Gary A. Kordosky, all of Tucson, Ariz.

[73] Assignee: Henkel Corporation, Ambler, Pa.

[21] Appl. No.: 187,111

[22] Filed: Apr. 28, 1988

[51] Int. Cl.$^5$ .............................................. C01G 3/00
[52] U.S. Cl. ..................................... 423/24; 423/139; 423/DIG. 14; 204/107; 210/688
[58] Field of Search ................. 423/24, 139, DIG. 14; 75/117, 114, 101 BE; 204/107; 210/688

[56] References Cited

U.S. PATENT DOCUMENTS

| | | | |
|---|---|---|---|
| 3,939,203 | 2/1976 | Mattison et al. | 260/566 A |
| 4,023,964 | 5/1977 | DeMarthe et al. | 75/101 R |
| 4,042,664 | 8/1977 | Cardwell et al. | 423/24 |
| 4,083,758 | 4/1978 | Hamby et al. | 423/24 |
| 4,255,395 | 3/1981 | Gallacher et al. | 423/24 |
| 4,362,607 | 12/1982 | Ritcey et al. | 75/114 |
| 4,582,689 | 4/1986 | Kordosky | 423/24 |

FOREIGN PATENT DOCUMENTS 085522  8/1983  European Pat. Off. .

OTHER PUBLICATIONS

Solvent Extraction, Process Metallurgy 1, Part I, 1984, pp. 2-5, 20-21 and 62-63.
Solvent Extraction, Prin. and App. to Metallurgy, Part II, 1979, pp. 12-13, 290-293, 538-539, 226-229, and 312-313.

*Primary Examiner*—Robert L. Stoll
*Attorney, Agent, or Firm*—Ernest G. Szoke; Wayne C. Jaeschke; Patrick J. Span

[57] ABSTRACT

An improvement is disclosed in the solvent extraction process for recovering metal values, i.e. copper, from aqueous solutions, particularly aqueous solutions, containing copper and iron which may also include chloride, and more particularly to an improvement which provides for increased copper to iron ratios in the loaded organic extractant phase. The improvement comprises washing the loaded organic extractant phase prior to stripping of the copper values therefrom with an aqueous acidic scrub solution containing at least a portion of electrolyte.

17 Claims, 1 Drawing Sheet

SOLVENT EXTRACTION PROCESS

BACKGROUND OF THE INVENTION

1. Field of the Invention

The present invention relates generally to solvent extraction processes for recovery of metal values from aqueous solutions, particularly aqueous solutions containing copper and iron, and which may also contain chloride, and more particularly to an improvement in the process which provides increased copper to iron ratios in the loaded organic extractant phase. The improvement comprises washing the loaded organic extractant phase prior to stripping of the copper values therefrom with an aqueous acidic scrub containing at least a portion of electrolyte.

2. Statement of Related Art

U.S. Pat. No. 4,582,689 describes a solvent extraction process from which copper is extracted from aqueous leach solutions using hydroxy acryl oxime extractants in which enhancement of copper/iron selectivity was achieved by adjusting the retention time for mixtures of aqueous feedstocks and reagent containing organic phases in the mixer-settler stages of multistage extraction systems. A general description of a solvent extraction process is found therein.

Process Metallurgy 1, G. M. Ritcey and A. W. Ashbrook, Solvent Extraction: Principles and Applications to Process Metallurgy, Parts I and II, Elsevier Scientific Publishing Company, 1984 and 1979, respectively, describe solvent extraction principles and applications. Reference to washing or scrubbing of the loaded organic phase and minor leach solutions and extraction circuits to which the present invention may have applicability can be found on pages 2–5 and 62–63 of Part I and pages 12, 13, 226–229, 290–293, 312, 313, 538 and 539 of Part II.

BRIEF SUMMARY

Figure 1:
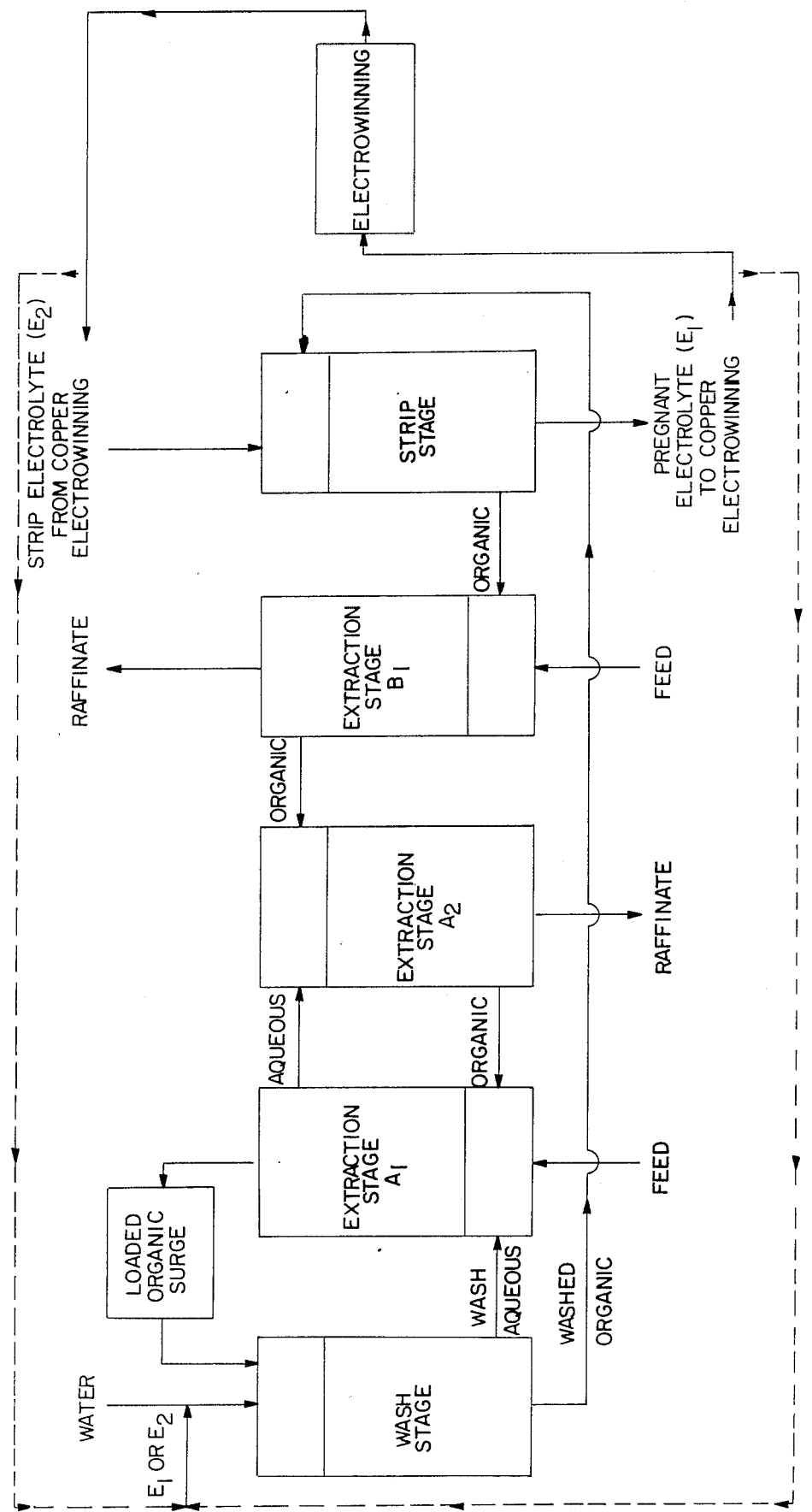
FIG. 1 of the Drawing is a diagrammatic flow chart illustrating a countercurrent flow extraction process utilizing the improvement of the present invention, which improvement comprises using at least a portion of electrolyte in the aqueous wash or scrub stage of the loaded organic prior to stripping of the copper from the loaded organic.

The present invention is an improvement in solvent extraction processes for recovery of copper values from aqueous feed solutions which also contain iron values, particularly feedstocks containing chloride. The invention provides for increased copper to iron ratios in the copper loaded organic phase from which the copper is stripped. The improvement comprises the use of at least a portion of electrolyte, either pregnant electrolyte from the strip stage or strip electrolyte from the electrowinning, in the wash stage of the loaded organic prior to stripping. It is found that when water alone is used in the wash stage, organic entrainment in the aqueous phase leaving the wash stage was quite heavy and no iron is stripped from the loaded organic. When water to which an electrolyte bleed is added for the wash or scrub aqueous solution, it is found that organic entrainment in the aqueous phase exiting the wash stage was very low and enough iron was scrubbed from the loaded organic such that the copper to iron ratio on the loaded organic at least doubled.

Other aspects of the present invention will become apparent upon consideration of the following detailed description and illustrative examples.

DETAILED DESCRIPTION

The starting material for large scale solvent extraction processing of copper is an aqueous leach solution obtained from a body of ore which contains a mixture of metals in addition to copper. The leaching medium dissolves salts of copper and other metals as it trickles through the ore, to provide an aqueous solution of the mixture of metal values, constituting the "Feed" for the extraction process shown in the drawing. The metal values are usually leached with sulfuric acid medium, providing an acidic aqueous solution.

The aqueous solution is mixed in tanks with an extraction reagent which is dissolved in an organic solvent, e.g., a kerosene. The reagent includes an extractant chemical which selectively forms metal-extractant complex with the copper ions in preference to ions of other metals. The step of forming the complex is called the extraction or loading stage of the solvent extraction process.

The outlet of the mixer continuously feeds to a large settling tank, where the organic solvent (organic phase), now containing the copper-extractant complex in solution, is separated from the depleted aqueous solution (aqueous phase). This part of the process is called phase separation. Usually, the process of extraction is repeated through two or more mixer/settler stages, in order to more completely extract the desired metal.

Where two or more mixer-settler stages are employed for extraction, countercurrent flow of the feedstock aqueous solution and the organic phase or reagent solution is employed. In a typical 3-stage extraction system, for example, the feedstock will flow through an initial mixer-settler stage ("$A_1$"), subsequently through a second stage ("$A_2$"). As represented in FIG. 1, Feed is also introduced into extraction stage $B_1$, and is contacted with organic from a strip stage. The organic phase will, in turn, initially contact the feedstock in $B_1$, encounter a subsequent contact in "$A_2$" and a final contact in "$A_1$". As a result, by the time the feedstock reaches mixer-settler stage $A_2$ substantial amounts of copper will have been extracted from it and it will be contacting an organic phase replete in copper. Correlatively, when the organic phase reaches mixer-settler stage $A_1$, much of the extractant will be in the form of copper-extractant complex and the organic phase will be contacting the feedstock solution when it is in a condition wherein little, if any, of the dissolved copper has been extracted.

After extraction, the depleted aqueous feedstock (raffinate) is either discharged or recirculated to the ore body for further leaching. The loaded organic phase containing the dissolved copper-extractant complex is fed to another set of mixer tanks, where it is mixed with an aqueous strip solution of concentrated sulfuric acid. As represented in the FIG. 1, stripped or spent electrolyte ("$E_2$") from the electrowinning step may be employed at least in part as the strip solution. The highly acid strip solution breaks apart the copper-extractant complex and permits the purified and concentrated copper to pass to the strip aqueous phase. As in the extraction process described above, the mixture is fed to another settler tank for separation. This process of breaking the copper-extractant complex is called the stripping stage, and the stripping operation may be repeated through two or more mixer-settler stages to more completely strip the copper from the organic phase.

From the stripping settler tank, the regenerated stripped organic phase is recycled to the extraction mixers to begin extraction again, and the strip aqueous phase is customarily fed to an electrowinning tankhouse, where the copper metal values are deposited on plates by a process of electrodeposition. After electrowinning the copper values from the aqueous solution, the solution, known as spent electrolyte, is returned to the stripping mixers to begin stripping again.

Reagents for use in practice of the improved processes of the invention include those containing one or more hydroxy aryl oxime extractants of the hydroxy aryl aldoxime or hydroxy aryl ketone oxime type.

Hydroxy aryl ketoxime extractants which may be employed in reagents for practice of the invention are those of Formulas I and II below:

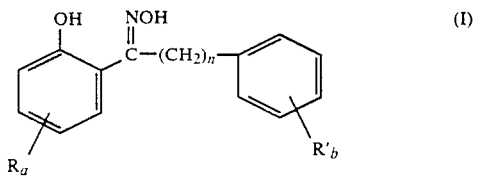

in which R and R' may be individually alike or different and are saturated aliphatic groups of 1–25 carbon atoms, ethylenically unsaturated aliphatic groups of 3–25 carbon atoms or —OR'' where R'' is a saturated or ethylenically unsaturated aliphatic group as defined; n is 0 or 1; and a and b are each 0, 1, 2, 3 or 4, with the proviso that both are not 0 and the total number of carbon atoms in $R_a$ and $R'_b$ is from 3 to 25,

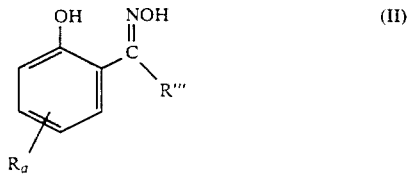

in which R and a are as defined with respect to Formula I and R''' is a saturated aliphatic group of 1–25 carbon atoms or an ethylenically unsaturated aliphatic group of 3–25 carbon atoms, with the proviso that the total number of carbon atoms in $R_a$ and R''' is from 3 to 25.

Preferred compounds of Formula I are those wherein a is 1, b is 0, R is a straight or branched chain alkyl group having from 7 to 12 carbon atoms, and wherein R is attached in a position para to the hydroxyl group. Among these, the more preferred are those wherein R is a mixture of isomers. Preferred compounds of Formula II are those wherein R''' is methyl and R and a are as designated as being preferred for compounds of Formula I.

Compounds of Formula I wherein n has a value of 0 (i.e., hydroxy benzophenone oxime compounds) may suitably be prepared according to the methods disclosed in Swanson U.S. Pat. Nos. 3,952,775 and 3,428,449. By reason of ease and economy of synthesis from available starting materials, ready solubility in organic diluents commonly employed in solvent extraction and desirable properties of complexes of the compounds with copper, preferred benzophenone oxime compounds of Formula I include those having a single alkyl ring substituent having from 7 to 12 carbon atoms in a position para to the hydroxy group, which alkyl substituent is a mixture of isomers. Examples of such compounds are 2-hydroxy-5-nonyl benzophenone oxime and 2-hydroxy-5-dodecyl benzophenone oxime which are obtained as mixtures of alkyl isomeric forms when commercial nonylphenol and dodecyl phenol are respectively employed in their synthesis.

Compounds of Formula I wherein n has a value of 1 (i.e., hydroxy phenyl benzyl ketone oxime compounds) may suitably by prepared according to the methods described in Anderson, U.S. Pat. No. 4,029,704. Preferred phenyl benzyl ketone oximes, like the above-noted benzophenone oximes, are those having an isomeric mixture of 7 to 12 carbon alkyl groups as a single substituent on the ring para to the hydroxyl group. These preferred compounds are exemplified by the compound, 2-hydroxy-5-nonylphenyl benzyl ketone oxime, as manufactured from a commercial nonylphenol comprising a mixture of nonyl isomeric forms.

Compounds of Formula II (i.e., hydroxy phenyl alkyl ketone oxime compounds) may suitably be prepared according to the procedures disclosed in U.K. Pat. No. 1,322,532. As noted with regard to benzophenone oxime and phenyl benzyl ketone oxime compounds of Formula I, preferred phenyl alkyl ketone oxime compounds of Formula II are those having an isomeric mixture of 7 to 12 carbon alkyl groups as a single substituent on the ring para to the hydroxyl group. Also preferred are compounds wherein the R''' alkyl group is methyl. Consequently, illustrative of preferred phenyl alkyl ketone oxime compounds is 2-hydroxy-5-nonyl phenyl methyl ketone oxime manufactured through use of commercial nonylphenol.

Hydroxy aryl aldoxime extractants which may be employed in reagents for practice of the invention are those of Formula III

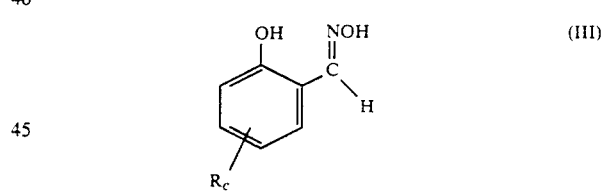

in which R is as defined above with respect to Formulas I and II, c has a value of 1, 2, 3 or 4, and the total number of carbon atoms in $R_c$ is from 3 to 25. Preferred compounds of Formula III are those wherein c is 1, R is a straight or branched chain alkyl group having from 7 to 12 carbon atoms, and wherein R is attached in a position para to the hydroxyl group. Among these, the more preferred are those wherein R is a mixture of isomers.

Compounds of Formula III (i.e., hydroxy benzaldoxime compounds, sometimes referred to as "salicylaldoximes") may suitably be prepared according to the methods described in Ackerley, et al., U.S. Pat. Nos. 4,020,105 or Ackerley et al., 4,020,106 or by oximation of aldehydes prepared according to Beswick, U.S. Pat. No. 4,085,146. Again, preferred compounds are those having an isomeric mixture of isomeric 7 to 12 carbon alkyl groups as a single substituent para to the hydroxyl group. Mixed alkyl isomeric forms of 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime are thus preferred.

Reagents useful in practice of the invention may include either kinetic additives or equilibrium modifiers or both. Preferred kinetic additives include α-hydroxy oximes described in Swanson, U.S. Pat. No. 3,224,873 and α, β-dioximes described in Koenders, et al., U.S. Pat. No. 4,173,616. Preferred equilibrium modifier chemicals include aliphatic alcohols such as tridecanol, alkyl phenols such as nonylphenol and organophosphorous compounds such as tributyl phosphate.

Reagents may include a single extractant chemical as illustrated above or may comprise mixtures of different aldoxime or ketoxime extractants of the type illustrated in U.S. Pat. Nos. 4,507,268, 4,544,532 and 4,582,689.

As indicated earlier the oxime extractant reagent is dissolved in an essentially water-immiscible, liquid hydrocarbon solvent and the resulting organic solution is contacted with the copper containing aqueous phase to extract at least a portion of the copper values into the organic phase. The phases are then separated and the copper values are stripped from the loaded organic phase by use of an aqueous stripping medium. Prior to stripping it is common to wash the loaded organic phase. The improvement of the present invention lies in the use of at least a portion of electrolyte in this aqueous wash or scrub stage.

A wide variety of essentially water-immiscible, liquid hydrocarbon solvents can be used in the metal recovery process of the present invention. These include: aliphatic and aromatic hydrocarbons such as kerosenes, benzene, toluene, xylene and the like. The choice of the said essentially water-immiscible liquid hydrocarbon solvent for particular commercial operations will depend on a number of factors the design of the solvent extraction plant (i.e., mixer-settlers, Podbielniak extractors, etc.), the value of the metal being recovered, disposal of plant effluent and the like. The process of the present invention finds particular use in the extraction recovery of copper from solutions containing iron and chloride. Essentially, all of the major plants in operation currently for the recovery of Cu use mixer-settlers, with relatively large organic inventories and some loss of solvent invariably occurs by evaporation, entrainment in the aqueous and the like. Under these circumstances, preferred solvents for use in the metal recovery processes of the present invention are the aliphatic and aromatic hydrocarbons having flash points of 150° F. and higher and solubilities in water of less than 0.1% by weight. These solvents are chemically inert and the costs thereof are currently within practical ranges—i e., normally about one dollar (U.S.) per gallon. Representative commercially available solvents are Kermac 470B (an aliphatic kerosene available from Kerr-McGee—Flash Point 175° F.), Chevron Ion Exchange Solvent (available from Standard Oil of California—Flash Point 195° F.), Escaid 100 and 110 (available from Exxon-Europe—Flash Point = 180° F.), Exxsol D 80 available from Exxon USA corresponds to Escaid 110, Norpar 12 (available from Exxon-U.S.A.—Flash Point 160° F.), Conoco C-1214 available from Conoco—Flash Point 160° F.), Aromatic 150 (an aromatic kerosene available from Exxon U.S.A.—Flash Point 150° F.), and various other kerosenes and petroleum fraction available from other oil companies.

In the process of the present invention, the organic solvent solutions will preferably contain from about 2 to 75% by weight of the extractant reagent and even more preferably from about 5 to 20% by weight thereof. Additionally, volume ratios of the organic:aqueous phase vary widely since the contacting of any quantity of the reagent solution with the metal containing aqueous phase will result in extraction of metal values into the organic phase. However, for commercial practicality, the organic:aqueous phase ratios are preferably in the range of about 5:1 to 1:5. For practical purposes, the extracting and stripping are normally conducted at ambient temperatures and pressures although higher or lower temperatures and/or pressures are entirely operable. Most advantageously, the entire process can be carried out continuously with the stripped organic solvent solution being recycled for contacting further quantities of metal containing solution. The process may however, be carried out as a batch process where desirable.

As indicated the process improvement of the present invention is particularly applicable to extraction of copper from chloride solution. Illustrative of such chloride solution extraction is found on pages 227–229 and 312–313 of Part II of the Ritcey and Ashbrook text noted in the Background of the Invention. The invention is applicable to copper containing chloride solutions containing from about 0.5–50 g/l copper, preferably from about 3–40 g/l copper.

The solutions will generally contain from about 8 to 20 g/l Cl more commonly about 5–15 g/l Cl.

To further illustrate the various objects and advantages of the present invention, the following examples are provided. It is understood that their purpose is entirely illustrative and in no way intended to limit the scope of the invention.

EXAMPLE I

The organic phases in this example are mixtures of commercially available, copper chelating, oxime extractants. For the first run the organic consisted of a mixture containing 2.8 v/v% HS-LIX 64N, 0.80 v/v% LIX 84 and 0.42 v/v% LIX 860 in kerosene (Kermac 470B). For the second circuit run the organic consisted of a mixture containing 2.8 v/v% HS LIX 64N, 0.80 v/v% LIX 84 and 0.80 v/v% LIX 860 in Kermac 470B. These reagents are described as:

HS-LIX 64N: a mixture of 2-hydroxy-5-nonylbenzophenone oxime and 4,8-diethyl-7-hydroxydodecan-6-oxime in kerosene.
LIX 860: 5-dodecylsalicylaldoxime in kerosene.
LIX 84: 2-hydroxy-5-nonylacetophenone oxime in kerosene.

A feed solution containing 0.89 g/l Cu, 1.04 g/l Fe and about 9 g/l Cl at a pH of 2.17 was treated at 23° C. in a conventional laboratory solvent extraction circuit containing 2 extraction stages, 1 wash stage and 1 strip stage with the organic phases set out above. The aqueous feed and organic phases were flowed at a 1/1 ratio. The strip and wash streams were flowed at equal rates equal to about 1/18 of the feed and organic flows. Recycles were employed when necessary so that the organic/aqueous phase ratios were 1/1 in the mixers. Mixer retention times were 2 minutes. The loaded organic phase exiting the extraction section proceeded to the wash stage and then to the strip stage.

Two circuit runs were made under identical conditions except that for the first run water was used as the wash solution. In the second run the wash solution consisted of a solution containing 5 volume units of strip electrolyte per 95 volume units of water. The flow from the wash stage was routed to the feed stream and taken into the extraction section of the circuit. The reagent concentration of the second run was increased slightly as shown above in order to extract the extra amount of copper which advances into the extraction section with the advancing wash solution. Copper recovery in both circuits was about 96%. Iron analysis of the pregnant strip solution and the loaded and washed organic phases shows that iron transfer to the pregnant strip solution is decreased by about 50% when the bleed is added to the wash liquor.

|  | Circuits | |
| --- | --- | --- |
|  | Water wash | Water wash with Bleed Added |
| Pregnant strip | 143 ppm Fe | 60 ppm Fe |
| Loaded organic | 7.2 ppm Fe | 6 ppm Fe |
| Washed organic | 7.2 ppm Fe | 3.5 ppm Fe |

EXAMPLE II

The feed solution of example I was treated in a circuit containing 1 extraction stage, 2 extraction stages, 1 wash stage and 1 strip stage under conditions similar to those of Example 1. A general circuit diagram is shown in FIG. 1. The organic contains a mixture of commercially available copper, chelating extractants consisting of 2.8 v/v% HS-LIX 64N and 5.2 v/v% LIX 984 (LIX 984 is a 1/1 blend of LIX 84 and LIX 860)in Kermac 470B. This reagent concentration is sufficient to give about 90% copper recovery. The aqueous exiting the wash stage is advanced to the two counter-current stages of extraction. The wash solution for the first circuit run was water while for the second run it consisted of mixture containing 16 v/v% strip electrolyte (this would be the tankhouse bleed) in water. The advancing wash solution was only 4.4% of the organic flow. Recycles were employed when necessary to maintain mixer organic/aqueous ratios of about 1/1. Iron analysis of the loaded and washed organic phases shows that the addition of bleed to the wash solution decreases iron transfer to the tankhouse by more than 50% compared to the case where no strip electrolyte is added to the wash.

|  | Circuits | |
| --- | --- | --- |
|  | Water Wash | Water Wash With Bleed Added |
| Loaded Organic | 15.5 ppm Fe | 11 ppm Fe |
| Washed Organic | 15.5 ppm Fe | 5 ppm Fe |

EXAMPLE III

A feed solution containing 0.62 g/l Cu and 1.45 g/l Fe at a pH of 2.07 was treated in a circuit as described in example 2. The organic contained 2.8 v/v% HS-LIX 64N and 3.0 v/v% LIX 984 in Kermac 470B. About 93–94% copper recovery was realized. Again one circuit run used water as the wash liquor while another circuit used a solution of 10% strip electrolyte in water as the wash solution. The wash solution advanced at a ratio of 2.2% of the organic advance flow. Iron analysis of the barren and pregnant electrolytes and the loaded and washed organic is shown below. Iron transfer to the electrolyte decreases by a factor of about 4 when the wash stage contains some strip electrolyte.

|  | Circuits | |
| --- | --- | --- |
|  | Water Wash | Water Wash With Bleed Added |
| Pregnant Strip | 500 ppm | 130 ppm |
| Barren Strip | 14 ppm | 16 ppm |
| Transfer | 486 ppm | 114 ppm |
| Loaded Organic | 35 ppm | 24 ppm |
| Washed Organic | 35 ppm | 4 ppm |

The electrolyte to be added to the aqueous wash water can vary over a wide range depending upon the flow of the wash water, the chloride content of the leach solution, the iron level the plant operator wishes to carry in the tankhouse electrolyte, the chloride level tolerable in the tankhouse liquor and the volume of chloride free water available. The electrolyte to be added to the aqueous acidic wash solution will range from about 1 to 20 v/v %. As seen in the examples at about 5, 10 and 16% levels, the iron transfer to electrolyte is significantly decreased.

Modifications and variations in the practice of the invention as illustrated above are expected to occur to those skilled in the art and consequently only those limitations as appear in the appended claims should be placed thereon.

We claim:

1. In a solvent extraction process for recovery of copper from an aqueous feedstock containing copper and iron values wherein the feedstock is contacted with an organic phase comprising a reagent composition including an hydroxy aryl oxime extractant and in which a copper loaded organic phase is provided by extraction of said copper values from said aqueous feedstock and wherein contact between the feedstock and the organic phase is accomplished by means of at least one mixer-settler extraction stage and at least one strip stage to provide a pregnant copper electrolyte from which the copper is electrowon to provide cathode copper and a stripped electrolyte the improvement comprising washing said copper loaded organic phase prior to stripping said copper values therefrom with an aqueous scrub solution containing at least a portion of electrolyte thereby providing an increased copper to iron ratio by weight in said copper loaded organic phase.

2. A process as defined in claim 1 in which said electrolyte is present in said aqueous acidic scrub solution in an amount of from about 1–20 volume to volume percent.

3. A process as defined in claim 2 in which said electrolyte is said pregnant copper electrolyte.

4. A process as defined in claim 2 in which said electrolyte is said stripped electrolyte.

5. A process as defined in claim 1 in which said aqueous feedstock is a chloride containing feedstock.

6. A process as defined in claim 5 in which said chloride containing feedstock contains up to 50 grams per liter Cl.

7. A process as defined in claim 6 wherein said feedstock contains from 5–15 g/l Cl.

8. The process of claim 1 wherein the reagent composition comprises:

(a) one or more hydroxy aryl ketone oxime compounds of Formula I or II,

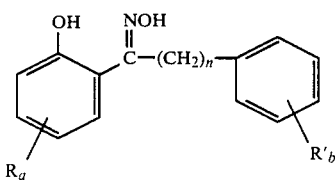

in which R and R' may be individually alike or different and are saturated aliphatic groups of 1-25 carbon atoms, ethylenically unsaturated aliphatic groups of 3-25 carbon atoms or —OR'' where R'' is a saturated or ethylenically unsaturated aliphatic group as defined; n is 0 or 1; and a and b are each 0, 1, 2, 3 or 4, with the proviso that both, are not 0 and the total number of carbon atoms in $R_a$ and $R'_b$ is from 3 to 25,

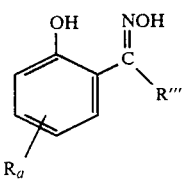

in which R and a are as defined with respect to Formula I and R''' is a saturated aliphatic group of 1-25 carbon atoms or an ethylenically unsaturated aliphatic group of 3-25 carbon atoms, with the proviso that the total number of carbon atoms in $R_a$ and R''' is from 3 to 25; and/or (b) one or more hydroxy aryl aldoxime compounds of Formula III,

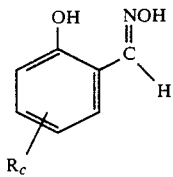

in which R is as defined above with respect to Formulas I and II, c has a value of 1, 2, 3 or 4, and the total number of carbon atoms in $R_c$ is from 3 to 25.

9. The process of claim 8 wherein the reagent composition comprises 2-hydroxy-5-nonyl benzaldoxime.

10. The process of claim 8 wherein the reagent composition comprises 2-hydroxy-5-dodecyl benzaldoxime.

11. The process of claim 8 wherein the reagent composition comprises 2-hydroxy-5-nonyl phenyl methyl ketone oxime.

12. The process of claim 8 wherein the reagent composition is a mixture of 2-hydroxy-5-nonylbenzophenone oxime and 2-hydroxy-5-dodecyl benzaldoxime.

13. The process of claim 8 wherein the reagent is a mixture of 2-hydroxy-5-nonylbenzophenone oxime, 2-hydroxy-5-dodecyl benzaldoxime and 2-hydroxy-5-nonylphenyl methyl ketone oxime.

14. In a solvent extraction process for the recovery of copper from an aqueous feedstock containing copper and iron values and up to about 50 g/l Cl wherein the feedstock is contacted with an organic phase comprising a reagent composition including an hydroxy oxime extractant in which a copper loaded organic phase is provided by extraction of said copper values from said aqueous feedstock by said oxime extractant and wherein contact between the feedstock and the organic phase is accomplished by means of at least one mixer-settler extraction stage and at least one strip stage to provide a pregnant copper electrolyte from which the copper is electrowon to provide cathode copper and a stripped electrolyte the improvement comprising washing said copper loaded organic phase prior to stripping said copper values therefrom with an aqueous scrub solution containing about 1-20 v/v% of electrolyte thereby providing an increased copper to iron ratio by weight in said copper loaded organic phase.

15. A process as defined in claim 14 in which said electrolyte is said pregnant copper electrolyte.

16. A process as defined in claim 14 in which said electrolyte is said stripped electrolyte.

17. A process as defined in claim 14 wherein said hydroxy aryl oxime extractant is selected from the group consisting of 2-hydroxy-5-nonylbenzophenone oxime, 2-hydroxy-5-dodecyl benzaldoxime, 2-hydroxy-5-nonyl benzaldoxime, 2-hydroxy-5-nonylphenyl methyl ketone oxime and mixtures thereof.

* * * * *